July 6, 1954   N. B. MICKELSON   2,683,230
ELECTROMAGNETIC DEVICE
Filed June 21, 1952                                2 Sheets-Sheet 1

INVENTOR.
Nils B. Mickelson

July 6, 1954  N. B. MICKELSON  2,683,230
ELECTROMAGNETIC DEVICE
Filed June 21, 1952  2 Sheets-Sheet 2

INVENTOR.
Nils B. Mickelson

Patented July 6, 1954

2,683,230

UNITED STATES PATENT OFFICE 2,683,230

ELECTROMAGNETIC DEVICE

Nils Bronander Mickelson, Stamford, Conn., assignor to The Reflectone Corporation, a corporation of Connecticut Application June 21, 1952, Serial No. 294,885

7 Claims. (Cl. 310—172)

The present invention relates to electric motors and particularly to a motor for electrically controlling the angular position and rotation of a remote shaft.

In the art of controlling the angular position and rotation of a remote shaft, step motor drives energized by direct current via selective relays or a stepping switch have been used. A simple embodiment of such a motor comprises a group, usually six, of stator poles with associated field coils and a rotor of cruciform shape made of soft magnetic material. In order to impart rotation to the rotor, several relays or a single stepping switch are used which serve to energize selectively the coils of the motor in such a sequence that motor rotation is attained in the desired direction and at the desired speed.

The step motor of the design described above imparts very high acceleration to the rotor. As this phenomenon is undesired, some attempts have been made to minimize this effect by resiliently coupling the rotor to the shaft which is to be positioned. Still further other mechanical means have been used which are not entirely satisfactory because of angular accuracy impairment caused by flexible coupling means.

A further shortcoming of previously used step motor designs is apparent in certain applications where it is desired to effect large and rapid changes in the position of the element under control of the step motor. In such cases when conventionally operated, the maximum speed of the motor is definitely limited by the switching arrangement to a value which is lower than desired for effecting such changes.

Another shortcoming of the previous arrangement is the undesirable arcing which takes place at the controlling switches. This arcing is caused by the high inductance of the windings and is responsible for a short contact life of the switches. In addition such arcing sets up undesirable electrical transients which frequently are introduced into nearby circuits.

One of the principal objects of the invention is the provision of a step motor which avoids one or more of the aforementioned shortcomings.

Another object of the invention is the reduction of the rate of flux increase in the field pole pieces thereby minimizing sudden mechanical accelerations imparted to the rotor.

Another object of the invention is the reduction of the apparent inductance of this particular motor type thereby diminishing excessive arcing at the switching contacts.

A still further object of the present invention is a step motor which may be operated with alternating current whenever high speed rotation of the rotor is desired.

Another important object of the invention is the provision of a direct current step motor which may be operated as a reversible induction motor.

The invention comprises an electro-magnetic device involving a stator provided with a plurality of field coils, a plurality of magnetic pole pieces and a rotor disposed intermediate said magnetic pole pieces having a plurality of salient poles. Means to reduce the rate of magnetic flux increase are disposed within said magnetic pole pieces and are adapted to influence the direction of said rotor. Cylindrical electrical conducting means encircle the rotor for causing said rotor to rotate when energizing a portion of said field coils with alternating current.

For a better understanding of the present invention together with other and further objects thereof reference is made to the following description taken in connection with the accompanying drawings.

Figure 1:
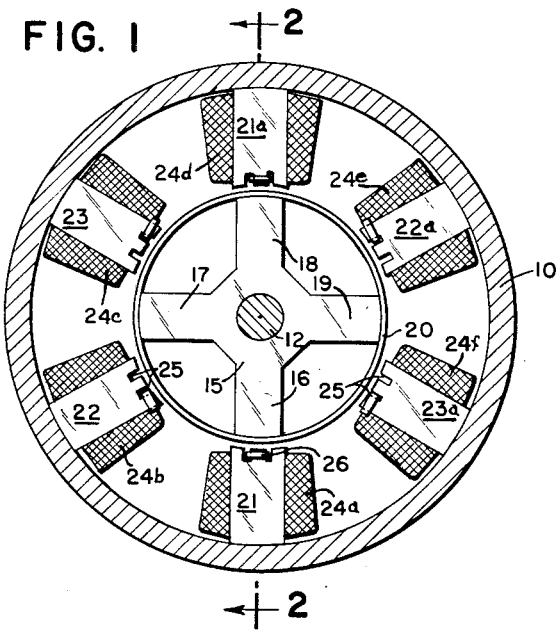
Figure 1 is a schematic vertical view at the plane 1—1 of Figure 2.
Figure 2:
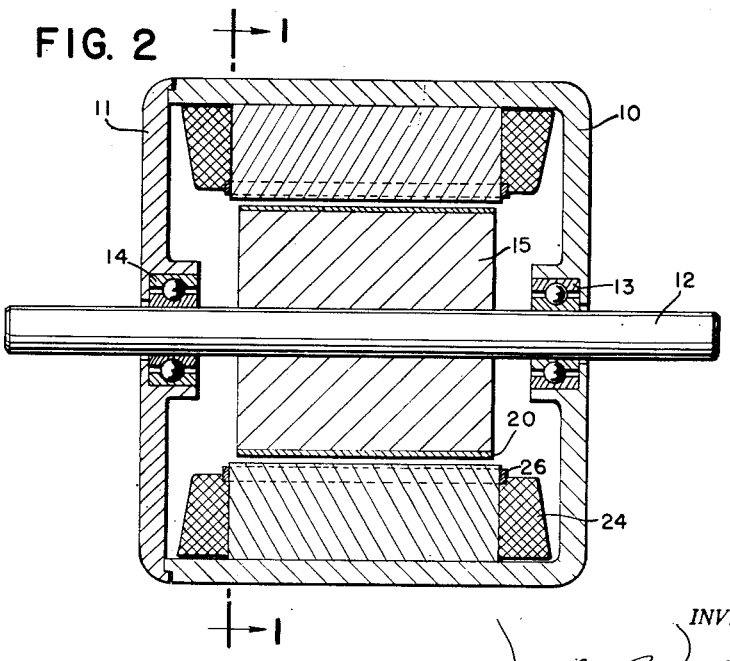
Figure 2 is a vertical cross-section at the plane 2—2 of Figure 1.

Referring to Figures 1 and 2, numeral 10 in general identifies a stator housing having a detachable end shell 11. A rotatable shaft 12 protrudes through the motor housing and is journaled by means of conventional anti-friction bearings 13 and 14 respectively. Attached to the shaft 12 there is a cruciform rotor 15 which preferably is made of soft magnetic material. Magnetically soft or non-retentive materials, as contrasted wtih retentive or magnetically hard materials, are such materials which are characterized by low coercive force, comparatively low hysteresis loss, relatively high permeability. Iron, for instance, having a purity of 99.99 per cent Fe is considered a magnetically soft material. The four salient poles 16, 17, 18 and 19 of cruciform rotor 15 are encircled by a continuous metallic shield 20 which is made of a material having a high electrical conductivity and a low magnetic permeability such as copper or aluminum. The purpose of this shield will be explained later.

The stator comprising housing 10 is equipped with three pairs of pole pieces, namely, pole pieces 21 and 21a, pole pieces 22 and 22a, and pole pieces 23 and 23a respectively. Each pole piece is surrounded by a field coil 24a, 24b, 24c, 24d, 24e and 24f respectively. Each pole face furthermore, is equipped with a pair of slots 25 adapted to receive a shading coil 26.

The pole pair comprising pole pieces 21 and 21a has its shading coils placed in such a manner that the shading coils are centered with respect to the face of the pole piece. In pole pieces 22 and 22a, the shading coils are shifted from the center of the pole face in counter-clockwise direction so that the shading coils surround an off-center portion of the pole piece. In pole pieces 23 and 23a the shading coils are shifted in a clockwise direction with respect to the center of the pole piece face.

Figure 3:
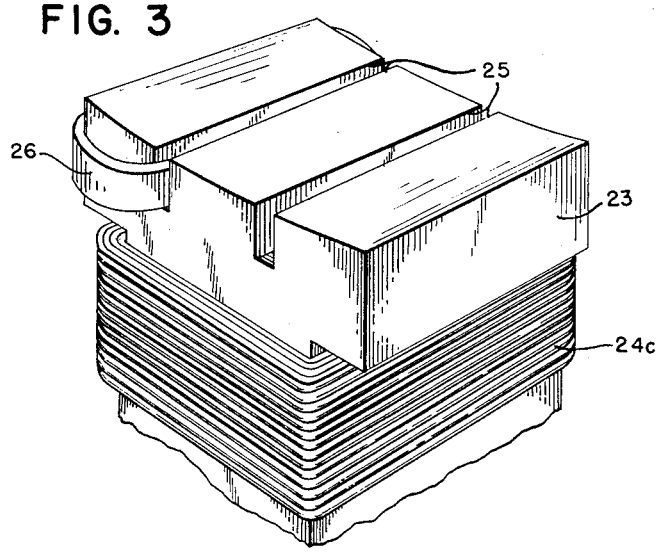
Figure 3 is a view of a typical magnetic pole piece.

Figure 3 shows a detail of pole piece 23 with shading coil 26 shifted from the center of the pole face in clockwise direction.

Figure 4:
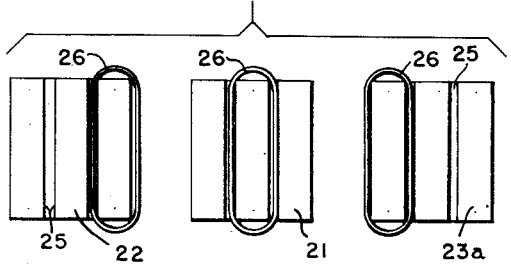
Figure 4 is a schematic plan view of a set of three pole faces.

In a similar manner Figure 4 shows a schematic plan view of three adjacently located pole pieces 22, 21 and 23a with shading coils 26 inserted therein. Shading coil 26 of pole piece 21 is centered with respect to the center of pole piece 21, while in the two pole piece pairs consisting of pole pieces 22 and 22a, and 23 and 23a respectively, the shading coils 26 are shifted off center with respect to the centers of the respective pole pieces so as to cause the angular dimension between the centers of two consecutive shading coils to differ substantially from the angular dimension between the centers of the respective consecutive pole pieces. The purpose of offsetting the shading coils of adjacently located pole pieces will be explained below.

Figure 5:
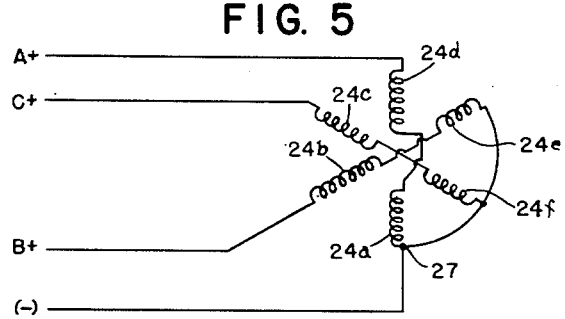
Figure 5 is a schematic wiring diagram of the field coils associated with the magnetic pole pieces.

Figure 5 shows schematically the electrical connection of the field coils 24a through 24f which surround the pole pieces. The field coils of each set of pole pairs are series connected and one terminal of the three pairs terminates at a common junction point 27. This junction point 27 is brought out to a terminal identified as (—). The other end of series connected field coils 24a and 24d terminates at a terminal marked A+, field coils 24b and 24e at a terminal marked B+, and field coils 24c and 24f at a terminal marked C+.

When applying direct current of suitable magnitude between terminals A+ and (—) field coils 24a and 24d of poles 21 and 21a are energized. This will align the cruciform rotor as shown in Figure 1, namely, salient pole 16 aligned opposite of pole piece 21 and salient pole 18 aligned opposite of pole piece 21a. As a next step direct current of suitable magnitude is applied between the terminals marked A+ and (—) together with B+ and (—), thereby causing field coils 24a and 24b, 24d and 24e to become energized causing rotor 15 to advance 30 degrees. As a further step direct current may be applied between the terminals marked B+ and (—) causing the rotor to advance another 30 degrees in clockwise revolution so that salient pole 18 becomes aligned opposite of pole piece 22a and salient pole 16 opposite of pole piece 22. In order to advance the rotor still further in a clockwise revolution the following terminals may be energized consecutively: B+ and (—) together with C+ and (—); then C+ and (—); then C+ and (—) together with A+ and (—); and lastly A+ and (—), at which time rotor 15 will have revolved 180 degrees from the starting position as shown in Figure 1.

In a similar manner the application of direct current may be varied in an analogous fashion to obtain counter-clockwise positioning of the rotor.

It is obvious that this step by step excitation of the field coils limits the speed with which the rotor may be positioned and that it is desirable in many cases to advance the rotor at a faster rate for a certain length of time or for a certain number of revolutions. In order to do this each pole piece is equipped with a shading coil which, as is well known, reduces the time rate of increase of the magnetic flux of that portion of the pole piece about which the shading coil is linked. By inserting a shading coil displaced from the center of the pole piece a second magnetic flux component is created which lags in time phase and as a result thereof the net field rotates from the pole center toward the shading coil. In the foregoing invention, Figures 1, 3 and 4, one pole piece pair has the shading coils shifted from the pole piece center in clockwise direction while the other pole piece pair has the shading coils shifted in counter-clockwise direction. This feature enables the rotor to be driven bidirectionally upon proper selection of the field coils energized.

Still further by encircling the rotor with a shield of high electrical conductivity and low magnetic permeability, the device becomes an induction motor rendered suitable for operation with alternating current.

In operation when it is desired to rotate the rotor at a rate higher than possible with D. C., the field coils are disconnected from direct current and suitably connected to alternating current. When energizing, for instance, terminals marked B+ and (—) with alternating current of suitable magnitude, field coils 24b and 24e are energized thereby causing the rotor to rotate in a counter-clockwise direction. Correspondingly when energizing terminals marked C+ and (—) with alternating current the rotor will rotate in clockwise direction thus obtaining a motor which is not only operable with direct current but is operable also as a reversible induction motor.

The arrangement of shading coils in the magnetic pole pieces not only enables operation of the motor with alternating current but also effects a lowering of the apparent inductance of the motor during operation with direct current. For this reason centered shading coils are provided in pole pieces 21 and 21a which remain de-energized during operation with alternating current but are effective during operation with direct current. Still further during operation with direct current these centered shading coils in pole pieces 21 and 21a tend to equalize the rate of rise of the magnetic flux occurring in the magnetic axis given by pole pieces 21 and 21a with respect to the magnetic axes established by the remaining pole pieces.

In a similar manner the provision of the shield encircling the rotor not only enables operation of the device with alternating current but also reduces the inductance of the motor. This lowered inductance results in diminished arcing of the switching contacts during operation with direct current and in a smoother acceleration of the rotor. Moreover, since during operation with direct current the ultimate flux values remain the same, the shading coils and the shield encircling the rotor having a low magnetic permeability do not cause a reduced torque to the rotor.

Although solid magnetic structures have been shown for the rotor and for the pole pieces it is obvious to those skilled in the art that laminated structures or other means may be used to reduce the eddy current losses of the device.

In a general manner while in the above description there have been shown and discussed certain particular and efficient embodiments of the invention, it should be understood that I do not wish to be limited thereto as there might be changes made in the arrangement, disposition and form of the parts without departing from the principle of the present invention as comprehended within the scope of the accompanying claims.

What is claimed is:

1. An electro-magnetic device comprising a stator provided with a plurality of field coils, a plurality of magnetic pole pieces and a rotor disposed intermediate said pole pieces having a plurality of salient poles, a shading coil disposed in each of said magnetic pole pieces in such a manner that the angular dimension between the centers of two consecutive shading coils differs substantially from the angular dimension between the centers of the respective consecutive magnetic pole pieces.

2. An electro-magnetic device comprising a stator provided with a plurality of field coils, a plurality of magnetic pole pieces and a rotor disposed intermediate said pole pieces having a plurality of salient poles, each of said magnetic pole pieces equipped with a pair of slots for receiving a shading coil in such a manner that each of said shading coils surrounds a portion of the associated magnetic pole piece and that the angular dimension between the centers of two consecutive shading coils differs substantially from the angular dimension between the centers of the respective consecutive magnetic pole pieces.

3. An electro-magnetic device comprising a stator provided with a plurality of field coils a plurality of magnetic pole pieces and a rotor disposed intermediate said pole pieces having a plurality of salient poles, a shading coil disposed in each of said pole pieces in such a manner that the angular dimension between the centers of two consecutive shading coils differs substantially from the angular dimension between the centers of the respective consecutive magnetic pole pieces and the salient poles of said rotor enveloped by a rotating cylindrical shield of high electrical conductivity and low magnetic permeability.

4. An electro-magnetic device comprising a stator provided with a plurality of field coils, a plurality of magnetic pole pieces and a rotor disposed intermediate said pole pieces having a plurality of salient poles of soft magnetic material, each of said pole pieces arranged with a pair of slots adapted to receive a shading coil, each shading coil arranged so as to surround a portion of its associated pole piece and the angular dimension between the centers of two consecutive shading coils being substantially different from the angular dimension between the centers of the respective consecutive pole pieces and a cylindrical metallic shield of high electrical conductivity and low magnetic permeability enveloping the periphery of said rotor and rotating therewith.

5. An electro-magnetic device comprising a stator provided with a plurality of field coils, a plurality of magnetic pole pairs, a shading coil disposed within each of the pole faces of said magnetic pole pairs and a salient pole rotor disposed intermediate said pole pairs, at least one first set of pole pairs having its respective shading coils shifted clockwise with respect to the center of each of said pole faces, at least one second set of pole pairs having its respective shading coils shifted counter-clockwise with respect to the center of each of said pole faces, at least one third set of pole pairs straddled by said first and by said second pole pairs, said third pole pair having its respective shading coil centers substantially coincident with the center of each of said respective pole faces and said salient pole rotor encircled by a shield of high electrical conductivity and low magnetic permeability.

6. An electromagnetic device comprising a stator provided with a first, a second and a third set of magnetic pole pairs; a field coil surrounding each pole; a shading coil disposed within each of the pole faces of said magnetic poles; a cruciform rotor disposed intermediate said pole pairs; said first set of pole pairs having its respective shading coils shifted clockwise with respect to the center of said pole faces; said second set of pole pairs having its respective shading coils shifted counter-clockwise with respect to the center of said pole faces; said third set of pole pairs straddled by said first and by said second pole pairs and having its respective shading coil centers substantially coincident with the center of said respective pole faces and a cylindrical shield of high electrical conductivity and low magnetic permeability fastened to the periphery of said rotor for rotation in synchronism therewith.

7. An electric motor comprising a stator provided with a plurality of magnetic pole pieces, at least one pair of said magnetic pole pieces equipped with shading coils disposed clockwise relative to the centers of the pole pieces associated therewith, at least another pair of magnetic pole pieces equipped with shading coils disposed counter-clockwise relative to the centers of the pole pieces associated therewith and a salient pole rotor disposed intermediate said pole pieces.

References Cited in the file of this patent

UNITED STATES PATENTS

| Number | Name | Date |
|---|---|---|
| 518,310 | Duncan | Apr. 17, 1894 |
| 1,794,459 | Huber | Mar. 3, 1931 |
| 1,978,855 | Balzer | Oct. 30, 1934 |
| 2,103,356 | Fisher | Dec. 28, 1937 |